Jan. 21, 1964  S. T. FREEMAN ETAL  3,118,450
DENTAL INSTRUMENT FOR ELECTRO-CHEMICAL THERAPY
Filed Dec. 15, 1961  3 Sheets-Sheet 2
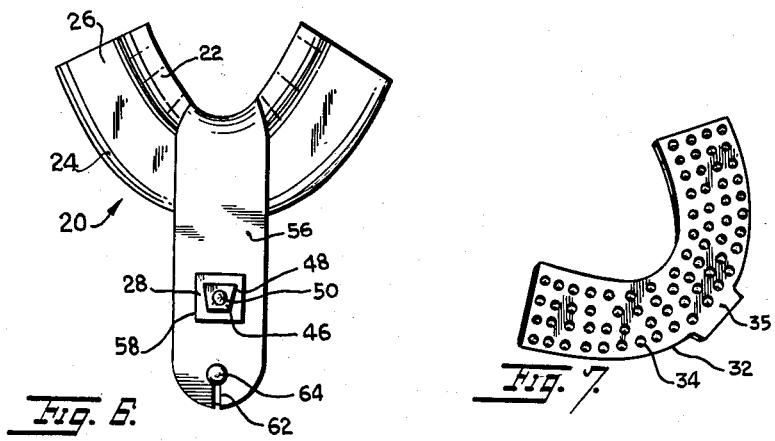
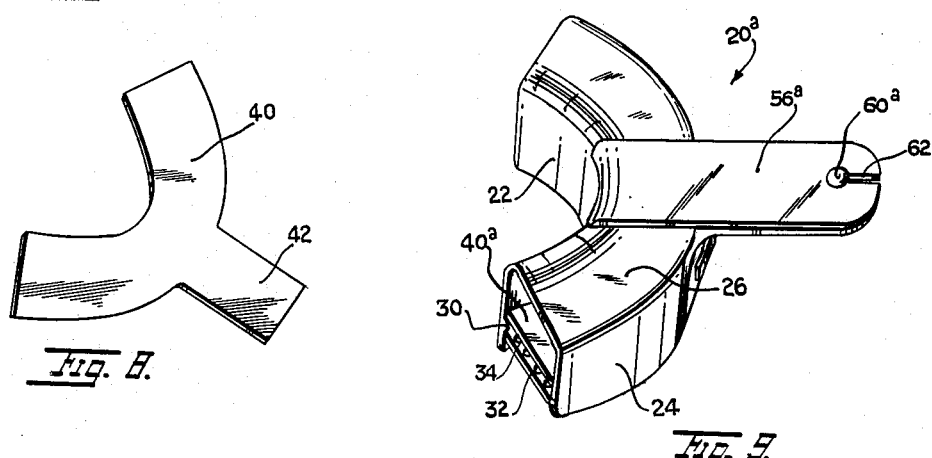
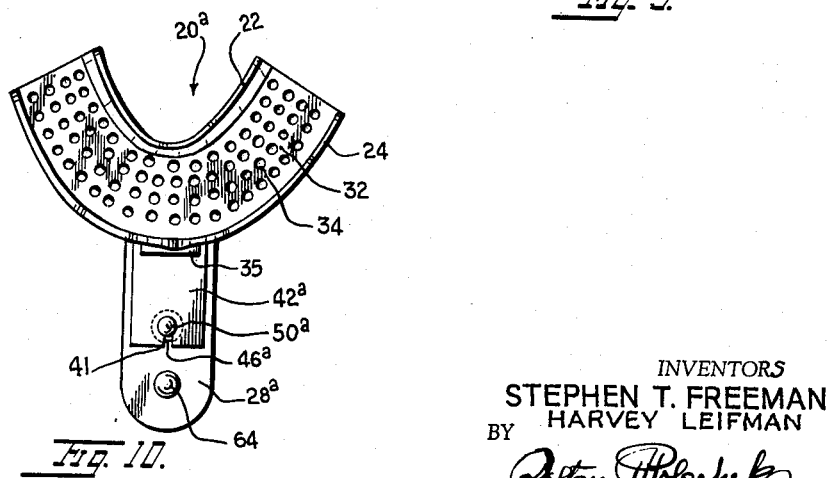
INVENTORS
STEPHEN T. FREEMAN
HARVEY LEIFMAN
BY
ATTORNEY Jan. 21, 1964 S. T. FREEMAN ETAL 3,118,450
DENTAL INSTRUMENT FOR ELECTRO-CHEMICAL THERAPY
Filed Dec. 15, 1961 3 Sheets-Sheet 3

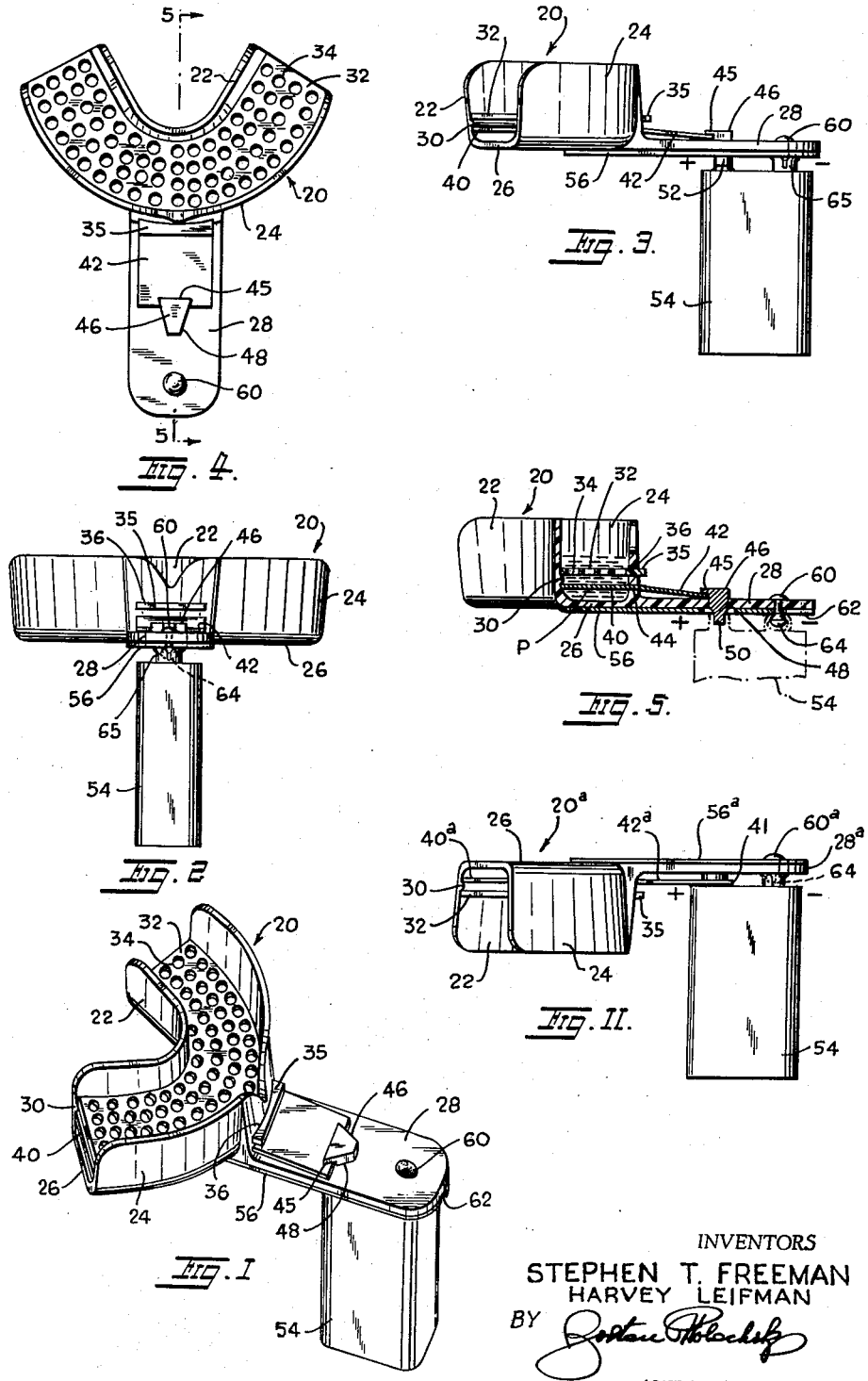

INVENTORS
STEPHEN T. FREEMAN
HARVEY LEIFMAN
BY
ATTORNEY

United States Patent Office 3,118,450
Patented Jan. 21, 1964

3,118,450
DENTAL INSTRUMENT FOR ELECTROCHEMICAL THERAPY
Stephen T. Freeman, 10 W. Fulton St., Gloversville, N.Y., and Harvey Leifman, 1220 NW. 180th Terrace, Miami 69, Fla.
Filed Dec. 15, 1961, Ser. No. 159,668
3 Claims. (Cl. 128—409)

This invention concerns a dental appliance for electrochemical therapy.

According to the invention there is provided a dental tray adapted to contain an electrolyte in paste form. The tray is provided with electrodes to which a battery can be connected for applying electric voltage thereto. When a patient is fitted with the tray and the battery is connected, electric currents flow through parts of the patient's oral tissues in contact with the electrolyte in the tray. The invention is adapted for use with trays to be fitted on both lower and upper teeth. The several parts of the tray are readily disassembled for cleaning and sterilization.

It is therefore a principal object of the invention to provide a dental tray adapted for use in electrochemical therapy.

A further object is to provide a dental tray having electrodes adapted for connection of a battery thereto for use in electrochemical therapy.

Another object is to provide a dental tray as described, wherein the tray has an electrode and partition which are readily removable for cleaning and sterilization.

Further further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a dental tray and associated battery according to the invention.

FIG. 2 is a front end elevational view of the tray and battery.

FIG. 3 is a side elevational view of the tray and battery.

FIG. 4 is a top plan view of the tray.

FIG. 5 is a sectional view taken on line 5—5 of FIG. 4, the battery being shown by dotted lines.

FIG. 6 is a bottom plan view of the tray, with battery removed.

FIG. 7 is a perspective view of a partition employed in the tray.

FIG. 8 is a perspective view of an electrode plate employed in the tray.

FIG. 9 is a perspective view of another dental tray adapted for use with the mandible of a patient.

FIG. 10 is a bottom plan view of the tray of FIG. 9.

FIG. 11 is a side elevational view of the tray of FIG. 9, with associated battery shown in full lines.

Figure 12:
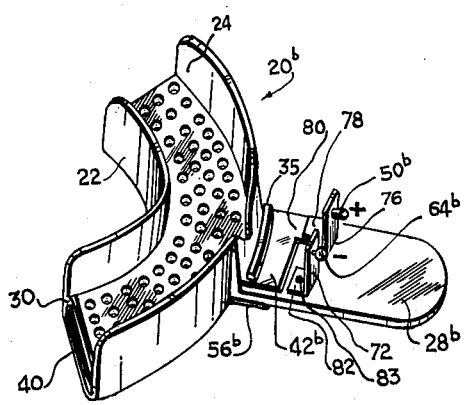
FIG. 12 is a perspective view of still another dental tray according to the invention.

Referring first to FIGS. 1–6, there is shown a dental tray 20 in the form of a trough-shaped body having inner and outer generally parallel arcuate walls 22, 24 integrally joined by a flat arcuate bottom wall 26. Secured to and integral with the outer wall is a handle 28. The handle is a flat plate which extends outwardly from the convex side of wall 24 parallel to the bottom wall 26. A ridge 30 is formed on the inner wall 22. On this ridge rests a flat arcuate partition 32. Partition plate 32 has numerous holes 34. The partition has an extension 35 at its convex edge; see FIG. 7. This extension fits in a slot 36 formed in the outer wall 24 above handle 28. Partition plate 32 is readily removable from the tray for cleaning and sterilization.

Below partition plate 32 is a flat arcuate plate 40. This plate, as clearly shown in FIG. 8, has an extension 42 extending outwardly from the convex edge of the plate 40. The plate extension 42 extends through a slot 44 formed in wall 24 just below slot 36. The free end of extension 42 engages under the lip 45 of an electrical terminal 46. The terminal is secured in an opening 48 in handle 28. The lower end of the terminal is formed as a cylindrical lug 50 to engage in a correspondingly shaped socket 52 of a battery 54. This socket serves as the positive terminal of the battery.

Underneath the handle 28 and wall 26 is an elongated flat metal plate 56. This plate has a hole 58 therein so that the plate 56 does not contact the terminal 46 which extends through holes 58 at the bottom of the handle; see FIG. 6. Plate 56 is removably secured by a rivet 60 to the handle. A slot 62 in the forward end of the plate permits the plate to slide into engagement with the rivet. The rivet has a depending knob 64 which serves as another electrical terminal. This terminal engages in a socket 65 of battery 54, which serves as the negative terminal of the battery.

The tray 20 including walls 22, 24, 26 and handle 28 is made of non-conductive or insulation material such as plastic. Partition plate 32 is also made of insulation material. Plates 40 and 56 are made of metal such as silver, copper, or other good electrically conductive material.

In operation of the appliance, a quantity of a paste electrolyte P shown in FIG. 5 is placed in the tray to a level higher than that of partition plate 32. The paste may be made of a substance such as agar-agar sodium alginate or the like. The paste may contain a salt such as sodium chloride and other chemicals to increase its electrical conductivity. After the tray is filled, it is inserted in the mouth of a patient. The teeth of the upper jaw rest on partition plate 32. The tongue and lower lip of the patient contact plate 56 under the tray. The battery 54 may now be connected to terminal elements 50 and 64. This completes an electrical circuit from positive terminal 52 of the battery, through terminal 46 and plate 56 to the electrolyte P. From electrolyte P the circuit is completed through the patient's upper and lower jaws to plate 56, terminal 60 and battery terminal 65. An electric current flows through the upper and lower jaws while the appliance is in use. This electric current provides therapeutic effects in certain diseases of the mouth and jaws.

FIGS. 9, 10 and 11 show another tray 20$^a$ similar to tray 20 and corresponding parts are identically numbered. Tray 20$^a$ is adapted for use in an inverted position on the lower teeth of a patient. Terminal 46$^a$ is engaged by a slot 41 formed in the forward end of electrode plate extension 42$^a$. Cylindrical lug 50$^a$, which engages the positive terminal 52 of battery 54, depends from the terminal 46$^a$ under the handle 28$^a$. Rivet 60$^a$, which engages slotted end 62 of plate 56, is reversed in position from that of rivet 60. Knob 64 depends from handle 28$^a$ to engage the socket 65 of battery 54. Other parts of the tray, partition and plates are the same as explained in connection with tray 20. The tray is used in a manner similar to that of tray 20. The paste P will be sufficiently viscous so that it does not fall out of the tray when the tray is in inverted position. The upper jaw and lip of the patient will contact plate 56ª. The lower teeth will be inserted in the electrolyte. The electric circuit will thus be completed in tray 20ª, from positive terminal 52 of the battery, through terminal element 50ª, and plate 40ª to the electrolyte. From the electrolyte the circuit continues through the lower teeth and jaw of the patient, the upper jaw and lip of the patient, plate 56ª and terminal 60ª to negative battery terminal 65.

Figure 13:
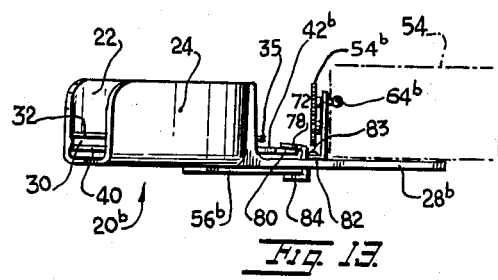
FIG. 13 is a side elevational view of the tray of FIG. 12.
Figure 14:
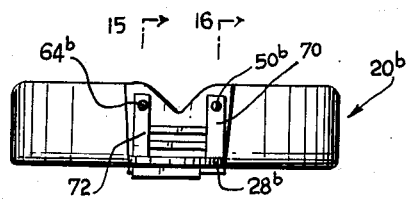
FIG. 14 is a front elevational view of the tray of FIG. 12.
Figure 17:
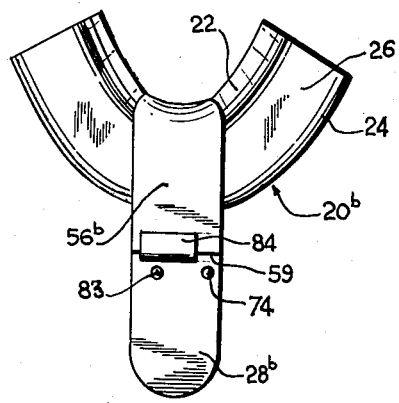
FIG. 17 is a bottom plan view of the tray of FIG. 12.
Figure 15:
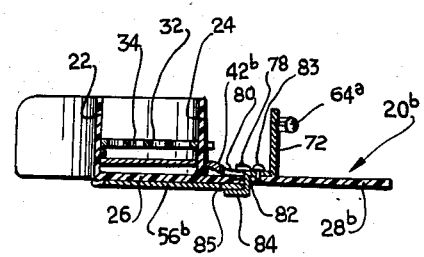
FIG. 15 and FIG. 16 are sectional views taken on lines 15—15 and 16—16, respectively, of FIG. 14.
Figure 16:
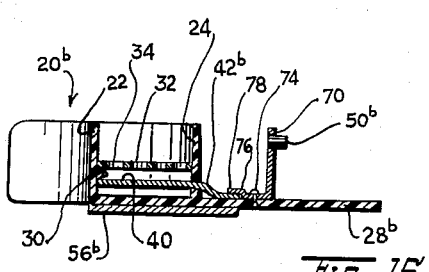

FIGS. 12–17 show another tray 20ᵇ adapted for mounting the battery 54 upon handle 28ᵇ. The positive battery terminal engages a cylindrical element 50ᵇ carried by an electrical terminal 70. The negative battery terminal engages a knob 64ᵇ carried by another electrical terminal 72. Terminal 70 is an upright spring finger secured to the handle 28ᵇ by a rivet 74 located at bent portion 76 of the terminal. The terminal 70 has a rearwardly extending finger 78 adapted to be detachably contacted by finger 80 formed at the forward end of electrode plate extension 42ᵇ. Terminal 72 is an upright spring finger having a rearwardly bent portion 82 secured by a rivet 83 to handle 28ᵇ. The terminal has a finger 84 which extends through a slot 85 in the handle and then projects rearwardly for detachably engaging the forward end 59 of plate 56ᵇ.

This arrangement permits the plates 40ᵇ and 56ᵇ to be readily removed from the tray when required for cleaning and sterilization or for replacement. The battery lies on the handle 28ᵇ. Tray 20ᵇ can be applied to either upper or lower teeth and will operate to apply electric currents to mouth and jaw parts in the same manner as trays 20 and 20ª.

A suitable variable resistor 54ᵇ may also be connected to the terminal members of the battery to control the electrical output of the battery.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. An appliance for use in dental electrochemical therapy, comprising a curved trough-shaped insulated body defined by an arcuate flat bottom wall joined at opposite curved edges by upstanding arcuate inner and outer walls, an elongated flat handle extending outwardly from said outer wall parallel to said bottom wall, an electrode plate removably seated in said body, said plate having an extension extending through a slot in said outer wall, a first electrical terminal on said handle contacted by said extension, a second plate, a second electrical terminal removably holding said second plate in juxtaposition to said bottom wall and the underside of the handle, the first and second terminals having terminal elements adapted to engage positive and negative terminals respectively of an electric battery for applying an electrical voltage to the plates, said inner wall having a ridge formed thereon engaging said electrode plate, and an insulated, flat arcuate plate removably inserted in said body on said ridge and spaced from said electrode plate, said insulated plate having a multiplicity of holes therein for passing viscous electrolyte therethrough, and an extension on said insulated plate engaged in another slot in said outer wall, the terminal elements both being located at one side of the handle and extending axially perpendicular thereto so that a battery connected to the terminal elements extends perpendicularly to the handle and depends therefrom.

2. An appliance for use in dental electrochemical therapy, comprising a curved trough-shaped insulated body defined by an arcuate flat bottom wall joined at opposite curved edges by upstanding arcuate inner and outer walls, an elongated flat handle extending outwardly from said outer wall parallel to said bottom wall, an electrode plate removably seated in said body, said plate having an extension extending through a slot in said outer wall, a first electrical terminal on said handle contacted by said extension, a second plate, a second electrical terminal removably holding said second plate in juxtaposition to said bottom wall and the underside of the handle, the first and second terminals having terminal elements adapted to engage positive and negative terminals respectively of an electric battery for applying an electrical voltage to the plates, said inner wall having a ridge formed thereon engaging said electrode plate, and an insulated, flat arcuate plate removably inserted in said body on said ridge and spaced from said electrode plate, said insulated plate having a multiplicity of holes therein for passing viscous electrolyte therethrough, and an extension on said insulated plate engaged in another slot in said outer wall, the terminal elements both being located at the upper side of the handle and extending axially parallel to the handle so that a battery connected to said element extends parallel to the handle.

3. An appliance for use in dental electrochemical therapy, comprising a curved trough-shaped insulated body defined by an arcuate flat bottom wall joined at opposite curved edges by upstanding arcuate inner and outer walls, an elongated flat handle extending outwardly from said outer wall parallel to said bottom wall, said body being adapted to contain a quantity of electrolyte, an electrode plate in said body adjacent to said bottom wall, a perforated insulated plate in said body spaced from and parallel to said electrode plate, a conductive plate outside of said body in contact therewith for contact with a patient's jaw, and electrical terminals carried by said handle electrically in circuit with the electrode and conductive plates, said electrical terminals being located at the upper side of the handle and extending axially parallel to the handle so that a battery connected to said elements extends parallel to the handle, and a variable resistor secured to the said terminals to control the electrical output of the battery.

References Cited in the file of this patent
UNITED STATES PATENTS

| | | |
|---|---|---|
| 527,037 | Funk | Oct. 2, 1894 |
| 1,389,662 | Irwin | Sept. 6, 1921 |
| 1,830,853 | Osterhage | Nov. 10, 1931 |
| 2,151,738 | Buhse | Mar. 28, 1939 |

FOREIGN PATENTS

| | | |
|---|---|---|
| 397,477 | Great Britain | Aug. 22, 1933 |